Jan. 29, 1952  A. G. ROSE  2,583,708

CHAIN CONVEYER

Filed April 14, 1947

INVENTOR:
A. G. ROSE.
BY
Munn, Liddy & Glaccum
ATTORNEYS

Patented Jan. 29, 1952

2,583,708

UNITED STATES PATENT OFFICE 2,583,708

CHAIN CONVEYER

Alfred German Rose, Gainsborough, England, assignor to Rose Brothers (Gainsborough) Limited, Gainsborough, England, a British company Application April 14, 1947, Serial No. 741,147
In Great Britain March 20, 1946

4 Claims. (Cl. 198—203)

This invention relates to chain conveyors of the kind intended for transporting articles from one station to another, and in which a series of article-supporting pockets are mounted on the chain. An object of the invention is to provide means for facilitating manipulation of the articles carried by the chain.

According to the invention, there is provided a chain conveyor of the above kind, comprising means for supporting and driving the chain, and means for periodically interrupting or varying the rate of the linear movement of a portion of the chain in timed relationship with the driving means without disturbing the driving operation of the driving means, by alternately reducing and increasing the length of the chain within the limits allowed by the play in the links.

Conveniently, the chain is mounted on two sprockets each driven by a worm and wormwheel, and the interruption or variation of the rate of linear movement of the chain may be brought about by axially reciprocating one of the worms on its driving shaft relatively to its wormwheel so as to cause the rate of rotation of the worm-wheel alternately to decrease and increase. Such reciprocation may be brought about by means of crank and link mechanism connecting the worm to a rotatable cam mounted on the worm shaft.

The invention has been found particularly useful in its application to conveyors for transporting articles from one part of an apparatus for manipulating the articles in a continuous manner to another part of an apparatus for manipulating the articles in an intermittent manner.

By way of example the invention will now be described in greater detail with reference to the accompanying diagrammatic drawings, as applied to a machine for wrapping sweets.

Figure 1:
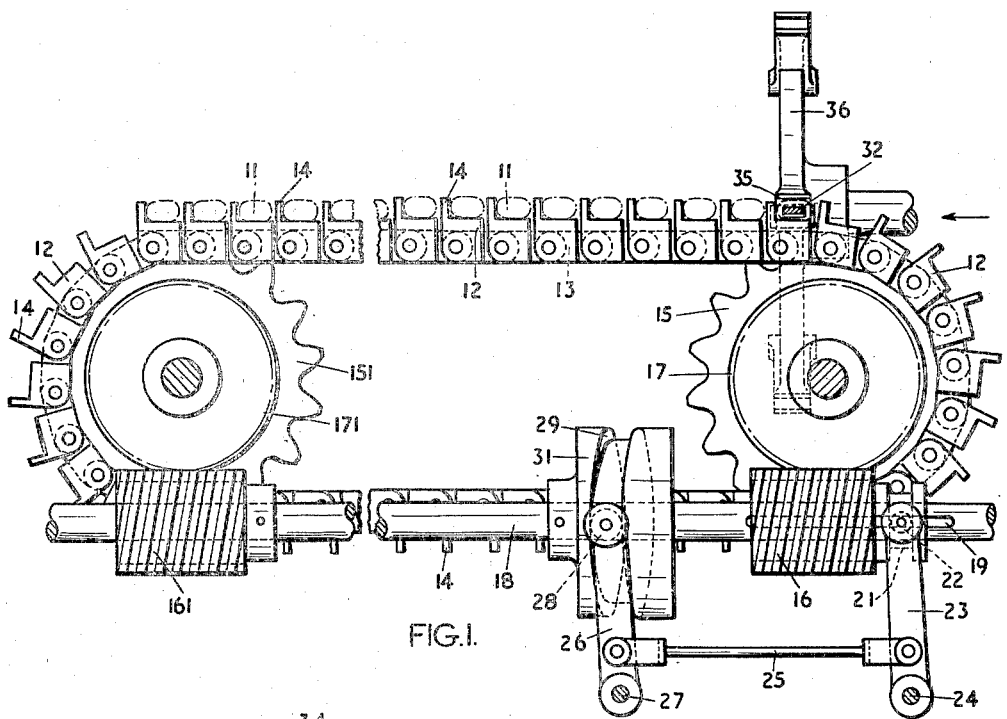
Figure 1 is a side elevation of part of such a wrapping machine.
Figure 2:
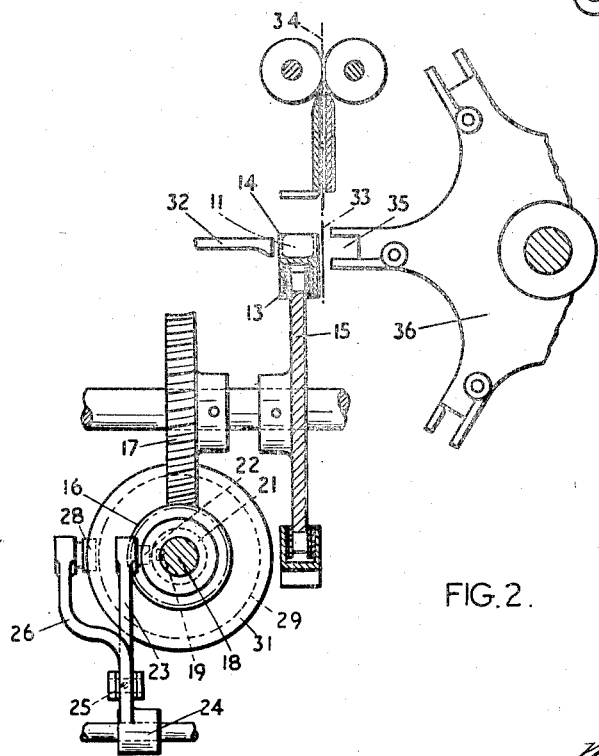
Figure 2 is an end elevation, partly in section, of the apparatus shown in Figure 1, viewed in the direction of the arrow in Figure 1.

Referring to the drawings, sweets 11 are delivered from a sweet moulding device (not shown) to a series of pockets 12 formed by alternate sweet-supporting members 14 attached to successive links of a chain 13 and constituting a feed conveyor.

The conveyor is supported at one end by a sprocket 15 disposed adjacent a transfer station and at the other end by a similar sprocket 151 disposed adjacent the moulding device. The sprocket 15 is driven by a worm 16 and a wormwheel 17 from a driving shaft 18. The worm 16 is slidably mounted on the shaft 18 and driven by means of a feather key 19. One end of the worm 16 is formed with an annular groove 21 in which is arranged to run a roller 22 freely mounted at one end of an arm 23 pivoted at 24. Connected to the arm 23 by a link 25 is a similar arm 26 pivoted at 27 and provided with a cam roller 28 arranged in engagement with an annular cam groove 29 formed in a rotatable cam member 31 secured to the shaft 18. The sprocket 151 is similarly driven by a worm 161 and wormwheel 171, the worm 161 being secured to the driving shaft 18. In this manner the chain 13 is freed from any driving tension.

At the transfer station, the sweets 11 are transferred from the pockets 12 of the chain 13 in succession by a reciprocating pusher 32 which pushes each sweet together with a wrapper 33 cut from a web 34 of wrapping material into a pocket 35 of an intermittently rotating pocket wheel 36 of the wrapping machine in well known manner. The pusher 32 is of the type described in United States specification No. 1,861,510, in that it is caused to lift at the end of its pushing stroke so as to return clear of the conveyor.

The pusher 32 is operated in timed relationship with the reciprocation of the worm 16 in such a manner that, as the pusher 32 is about to commence its pushing stroke, the worm 16 is about to move to the right (as viewed in Figure 1) under the influence of the arms 23 and 26, link 25 and cam member 31. The shape of the cam groove 29 is such that the rate of reciprocation of the worm 16 is equal to the linear movement of the chain 13, and it will thus be seen that, as the worm 16 moves to the right, it will cause the sprocket 15 to rotate in an anti-clockwise direction at the same rate as it is being driven in a clockwise direction by the rotation of the worm 16, with the result that no motion will be imparted to the portion of the chain adjacent the pusher 32 during such anti-clockwise rotation of the sprocket 15. The duration of the anti-clockwise rotation of the sprocket 15 is sufficient to cause the portion of the chain adjacent the pusher 32 to remain at rest during the pushing stroke of the pusher 32 despite the continuous motion of the portion of the chain receiving the sweets from the moulding device. The result of this action on the chain is that the length of the chain is momentarily shortened by taking up the clearances in the individual links, and whilst a sensible rest period can be obtained in this manner by utilising the normal pin clearances in a normal commercial chain, the total clearance depending on the length of the chain, it will be understood that it is advisable to provide a chain the links of which have sufficient play to allow the chain to be reduced in length by an amount somewhat in excess of that required to permit the rest periods of the chain during the movements of the pusher.

After each movement of the pusher 32, the chain is accelerated so as to bring the next succeeding pocket into the position relatively to the pusher that it would have taken up had the movement of the chain not been interrupted. This is brought about by continued rotation of the cam member 31 causing the worm 16 to slide in the opposite direction (to the left as viewed in Figure 1), such movement of the worm 16 causing the worm-wheel 17 to rotate in the same direction as it is being driven by the rotation of the worm 16 thus causing the sprocket 15 to drive the chain 13 at an increased rate. In this manner, the length of the chain is alternately decreased and increased in timed relationship with the movement of the pusher 32.

I claim:

1. A chain conveyor for transporting articles from one station to another, comprising a pair of driven sprockets spaced apart along a length of the chain and arranged in driving engagement therewith, a worm wheel in driving connection with one of said sprockets, a driving shaft, a worm slidably mounted on the driving shaft and arranged in engagement with the worm wheel, and an actuating member for reciprocating the worm on its driving shaft so as to impart to a portion of the moving chain a relative movement alternately in opposite directions within the limits allowed by the play in the chain links.

2. A chain conveyor for transporting articles from one station to another, comprising a pair of driven sprockets spaced apart along a length of the chain and arranged in driving engagement therewith, a worm wheel in driving connection with each of said sprockets, a driving shaft, a worm secured to the driving shaft and arranged in engagement with one of said worm wheels, a second worm slidably mounted on the driving shaft and arranged in engagement with the other of said worm wheels, and an actuating member for reciprocating the second worm on the driving shaft so as to impart to a portion of the moving chain a relative movement alternately in opposite directions within the limits allowed by the play in the chain links.

3. A chain conveyor as in claim 2, comprising a rotatable cam for oscillating said actuating member.

4. In a wrapping machine, the combination with an intermittently movable pocket member arranged to receive the articles to be wrapped in succession at a transfer station, of a chain conveyor comprising a pair of driven sprockets spaced apart along the length of the chain and arranged in driving engagement therewith, a portion of said chain being arranged adjacent the transfer station, a worm wheel in driving connection with each of said sprockets, a driving shaft, a worm secured to the driving shaft and arranged in engagement with one of said worm wheels, a second worm slidably mounted on the driving shaft and arranged in engagement with the other of said worm wheels, that other worm wheel being adjacent the transfer station, an actuating member for reciprocating the second worm on the driving shaft so as to impart to said portion of the moving chain a relative movement alternately in opposite directions within the limits allowed by the play of the links, whereby said portion of the chain momentarily remains stationary, and a transfer member operating in synchronism with said actuating member for transferring the articles in succession from said portion of the chain to said pocket member while said portion is stationary.

ALFRED GERMAN ROSE.

REFERENCES CITED

The following references are of record in the file of this patent:

UNITED STATES PATENTS

| Number | Name | Date |
| --- | --- | --- |
| 1,488,251 | House | Mar. 25, 1924 |
| 1,673,904 | Dirzuweit | June 19, 1928 |
| 2,369,540 | Delamere | Feb. 13, 1945 |